(12) United States Patent
Christensen

(10) Patent No.: US 6,421,340 B1
(45) Date of Patent: Jul. 16, 2002

(54) METHOD AND A DETECTOR UNIT FOR SETTING UP CONNECTIONS IN A TELETRANSMISSION NETWORK

(75) Inventor: Lars G. Christensen, Copenhagen (DK)

(73) Assignee: DSC Communications A/S (DK)

(*) Notice: Subject to any disclaimer, the term of this patent is extended or adjusted under 35 U.S.C. 154(b) by 0 days.

(21) Appl. No.: 09/171,627

(22) PCT Filed: Apr. 18, 1997

(86) PCT No.: PCT/DK97/00178

§ 371 (c)(1),
(2), (4) Date: Apr. 26, 1999

(87) PCT Pub. No.: WO97/40614

PCT Pub. Date: Oct. 30, 1997

(30) Foreign Application Priority Data

Apr. 19, 1996 (DK) .............................. 0470/96

(51) Int. Cl.⁷ .......................... H04L 12/46; H04L 12/56
(52) U.S. Cl. .................. 370/352; 370/395.1; 370/465; 379/93.09
(58) Field of Search ................................ 370/352, 353, 370/354, 356, 388, 493, 492, 395, 465, 338, 466, 467, 395.1, 395.2; 379/220.01, 93.09

(56) References Cited

U.S. PATENT DOCUMENTS

| | | | | |
|---|---|---|---|---|
| 5,475,735 A | * | 12/1995 | Williams | 379/59 |
| 5,572,515 A | * | 11/1996 | Williamson | 370/17 |
| 5,625,677 A | * | 4/1997 | Feiertag | 379/97 |
| 5,756,280 A | * | 5/1998 | Soora | 348/7 |

FOREIGN PATENT DOCUMENTS

| | | |
|---|---|---|
| CA | 2162860 | 1/2001 |
| DE | 2219104 | 10/1973 |
| DE | 4008790 | 9/1991 |
| EP | 0621714 | 10/1994 |

OTHER PUBLICATIONS

PCT Search Report, dated Jul. 29, 1997.

* cited by examiner

Primary Examiner—Hassan Kizou
Assistant Examiner—Minh Dieh A
(74) Attorney, Agent, or Firm—Baker Botts L.L.P.

(57) ABSTRACT

In a method of setting up connections for the transfer of information in the form of calls between at least two arbitrary subscribers in a teletransmission network (1), it is detected at a subscriber interface on the basis of an identification associated with a given call whether the call is of a first type or of a second type. Then the connection is set up via a first transmission path comprising one or more exchanges (2) in case of calls of the first type, and via a second transmission path bypassing the exchange or exchanges (2) in case of calls of the second type. A detector unit (25; 41), for use in the setting up of connections in such a teletransmission network (1) comprises circuitry (32, 33; 43) for detecting on the basis of an identification associated with a given call whether the call is of the first type or of the second type. The detector unit moreover comprises circuitry (34) for setting up calls of the first type via the first transmission path and calls of the second type via the second transmission path.

15 Claims, 3 Drawing Sheets

Figure 1:
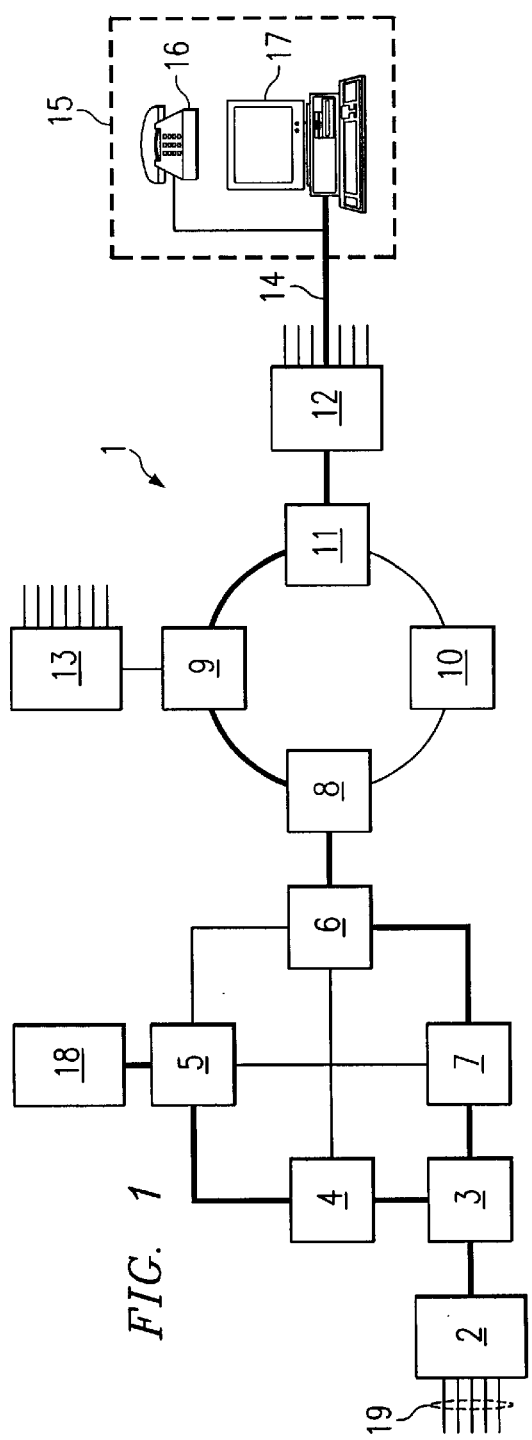

METHOD AND A DETECTOR UNIT FOR SETTING UP CONNECTIONS IN A TELETRANSMISSION NETWORK

The invention relates to a method of setting up connections for the transfer of information in the form of calls between a calling and a called subscriber in a teletransmission network, where each subscriber is connected to the network via a subscriber interface, and where, on the basis of an identification associated with a given call, it is detected whether the call is of a first or of a second type. In case of calls of the first type, the connection is set up via a first transmission path which comprises one or more exchanges, while in case of calls of the second type, the connection is set up via or switched to a second transmission path. The invention moreover relates to a detector unit for use in connection with the method.

Connections are traditionally set up via telephone exchanges in such transmission networks. When a subscriber wishes to get connected to a second subscriber, a connection is first set up from the first subscriber to the exchange to which he belongs, and then the exchange sets up a connection to the second subscriber. In case of local calls the latter connection will be directly from the exchange to the subscriber. In other cases, the connection goes via one or more other exchanges. Thus, it is an exchange which provides for the setting up of the connection, and moreover a connection from the first subscriber via one or more exchanges to the second subscriber will be occupied during the call.

Today the telephone network is not only used for the transmission of ordinary telephone calls, but also for different forms of data transmission (electronic mail, ISDN, etc.). In this connection it is known to transfer data between two data terminals connected to the network without the assistance of the traditional telephone exchanges, as, in such situations, the connection is instead set up by means of special exchanges or set-up units adapted for the purpose. Of course, this form of transmission requires that the network lends itself to this, and will therefore occur particularly in more recent network types composed of e.g. optical fibres, where the transmission can typically take place according to a system of a digitally designed hierarchy (e.g. SDH or PDH). This network type must be extended all the way to each subscriber or data terminal in this case, which is usually not the case. The data terminals must moreover be equipped with an interface to the transmission system concerned. This form of data transfer is therefore a rather expensive solution, which is of interest only to subscribers having a great need for data transmission. The data themselves will typically be transferred by means of a protocol which is specially adapted for the purpose, such as e.g. ATM (Asynchronous Transfer Mode) or ISDN.

In this connection it is known from GB 2 132 446 to arrange an exchange such that it is capable of handling two or more network layers, one of which may be for the normal telephone traffic, and the other may be for e.g. ISDN traffic or telex traffic.

Where a subscriber wishes to be able to transfer both ordinary telephone calls and data in the manner described, it will often be necessary to have two separate terminals and two separate connections to the network, and this in turn necessitates a sufficiently great data transmission need. Usually, the telephone exchange is connected to the network via an ordinary cable twisted in pairs, while the data terminal may be connected e.g. via an optical fibre cable.

Where the data transmission need is smaller, data terminals may instead be connected to the network via a modem and the ordinary telephone interface. This leads to a sort of hybrid calls, as these data transmissions are processed as ordinary telephone calls in the entire network and are converted into data again by means of a modem only at the receiver terminal.

These hybrid calls occur in rapidly increasing numbers and therefore occupy an ever greater part of the capacity of the exchanges and of the network itself. One reason is that new types of calls are generated. This applies to i.a. so-called Internet calls, which occur, because subscribers to the Internet, which is an international data network, are usually connected to it via the ordinary public telephone network. Subscribers to the Internet use a personal computer (PC) and a modem, and an Internet call is set up therefrom via the telephone network and the exchanges thereof to an Internet service provider, where it is likewise received by a modem and coupled to the Internet itself.

These calls are typical local calls, as the distance to the closest service provider is usually relatively short. Further, the calls are typically very long compared to the usual telephone traffic, and a connection is maintained during the entire call from the subscriber via one or more exchanges to the Internet provider, even though this connection is utilized poorly since there may be long pauses where no data are transmitted. When data are transmitted, then a high quality of the connection is required in order to avoid frequent retransmissions.

Thus, the problem is that these hybrid calls, transmitted in the network as ordinary telephone calls, occupy an excessively great capacity at the exchanges as well as in the network itself. As the use of both the Internet and other corresponding new types of transmission must be presumed to increase rapidly, there is thus a great need for extending the capacity of the existing networks, which i.a. calls for investments in new exchanges and extension of the existing ones.

European Patent Application EP 0 621 714 discloses a system wherein it is established in a high level exchange (toll switch) on the basis of calling information, derived from the called telephone number, whether a call is of a special type, in this case a toll free call to a voice response system. In that case, the call in the high level network, which connects the high level exchanges, may be processed in another manner than the normal calls, thereby allowing the call toll for such calls to be reduced. Since, however, the switching exclusively takes place in the high level network, it does not reduce the load on the subscriber exchanges and the networks connecting these to the individual subscribers, and, as mentioned, since the described Internet calls will typically be local calls, it is precisely here that the mentioned problems of capacity occur.

The invention is based on the finding that a great part of the new traffic, such as e.g. the Internet calls, in reality does not have to be set up via the exchanges at all; but may instead be processed in the greatest part of the network in the same manner as the above-mentioned direct data transfer between subscribers with a great data traffic.

The object of the invention is to provide a solution which is capable of giving a considerably increased capacity in the existing telecommunications network, without requiring the mentioned new investments in new exchanges or investments in expensive interface equipment at the subscribers.

This is achieved according to the invention in that the detection of the type of the call takes place at the subscriber interface of the calling subscriber, and that said second transmission path bypasses said exchange or exchanges.

This ensures that calls of the first type, which may e.g. be the ordinary telephone calls, are set up in the usual manner via the conventional telephone exchanges, while calls of the second type, which may e.g. be data calls, may be set up directly without the assistance of the exchanges. This means that these calls, the number of which may be expected to increase rapidly, as mentioned, need not occupy capacity at the exchanges, thereby making a greater capacity available to other calls.

When, as stated in claim 2, the detection of the type of the call takes place during the initial phase of the call, both the set-up and the entire subsequent call may be kept out of the exchanges, which are therefore loaded as little as possible.

In an alternative embodiment, the detection of the type of the call may take place at any time during the call. This involves the advantage that also calls changing type during the call may be set up via the most expedient path in the network. Further, it allows all calls to be set up as ordinary calls from the beginning, and that just calls which turn out to be e.g. data calls in reality, are set up via the direct route bypassing the exchanges.

As stated in claim 4, a particularly expedient field of use of the invention is calls to subscribers offering a specific service on the telephone network. In that case, the detection of the type of the call may take place by checking the telephone number to which the call concerned is made, as stated in claim 5. If the telephone number called corresponds to the number of the provider of the service concerned, the call is set up directly through the said second transmission path, while in all other cases it is set up in the traditional manner by means of the exchanges. Alternatively, as stated in claim 3, the detection may take place by detecting the information type of the call.

As stated in claims 6 and 7, the special service may be of the type which allows a telecommunications network subscriber to be connected to it via a second network, which may e.g. be the Internet.

Further, if, as stated in claim 8, data are transferred via the second transmission path by means of a protocol which just occupies capacity on the network in relation to the data amount transferred at a given time, it is ensured not only that the exchanges are free from these calls, but also that the network itself is loaded only when data are actually transferred. Since in particular the said Internet calls frequently have long periods where just few or no data at all are transferred, it is thus ensured that the network is practically not loaded during these periods, resulting in a far better utilization of its capacity.

The method is particularly expedient when, as stated in claims 10 and 11, it is used in a fibre-optical network where the transmission may take place according to a Synchronous Digital Hierarchy (SDH system), and where the second transmission path in the network is embedded in the SDH transmission by a special protocol for the transfer of data. As stated in claim 9, this protocol may be of the Asynchronous Transfer Mode (ATM) type, which is a protocol which just occupies capacity on the network in relation to the amount of data transferred.

When the part of the network connected to the subscribers from whom calls may be made, consists of cables twisted in pairs and having metallic conductors, while the rest of the network is substantially a fibre-optical network, the detection of the type of the call may expediently take place at an interface between the cable of the subscriber and the fibre-optical network, as stated in claim 12. This provides the shortest path in the network for the calls bypassing the exchanges, as the detection takes place as close to the subscriber as possible.

Alternatively, as stated in claim 13, at least some of the subscribers from whom calls may be made, may be connected to the network via a wireless connection, and the detection of the type of the call may take place at an interface between the wireless connection and the wired connection.

As mentioned, the invention also concerns a detector unit for use in the setting up of connections in a network of the stated type. When, as stated in claim 14, the detector unit is adapted to detect the type of the call at the subscriber interface of the calling subscriber and to set up said second transmission path bypassing said exchange or exchanges, then the above-mentioned more expedient setting-up of the calls of the second type, which may e.g. be data calls, is achieved.

The detector unit may either be adapted to detect the type of the call during the initial phase of the call by comparison with known telephone numbers, as stated in claim 15, or it may be adapted to detect the type of the call during the call by detecting the information type.

Figure 2:
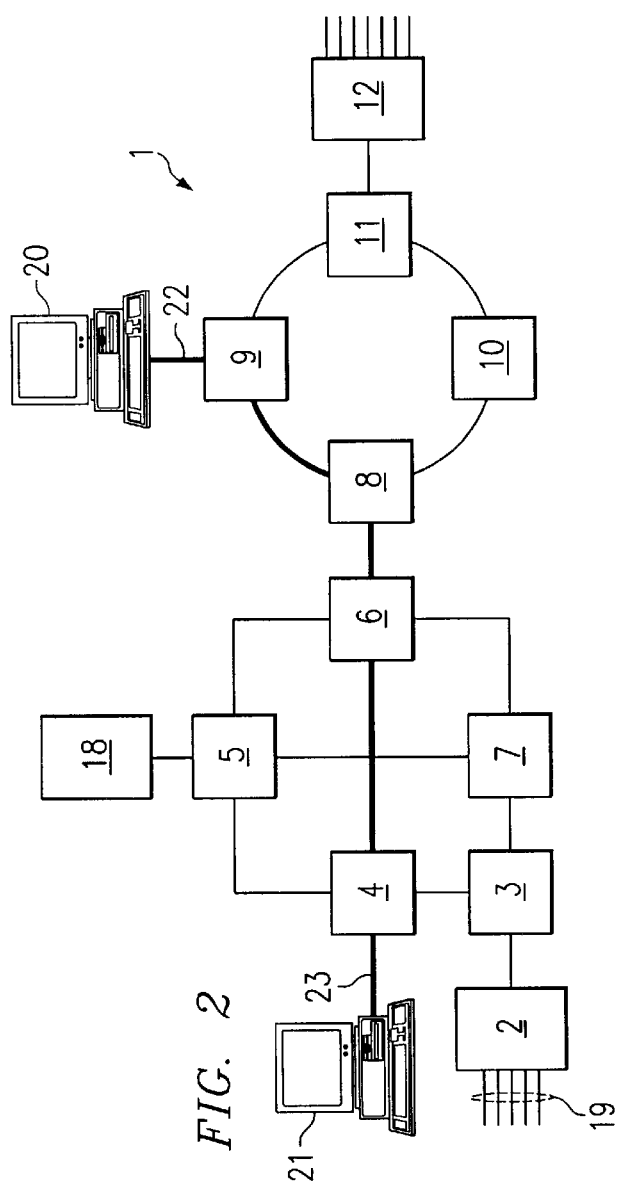
Figure 3:
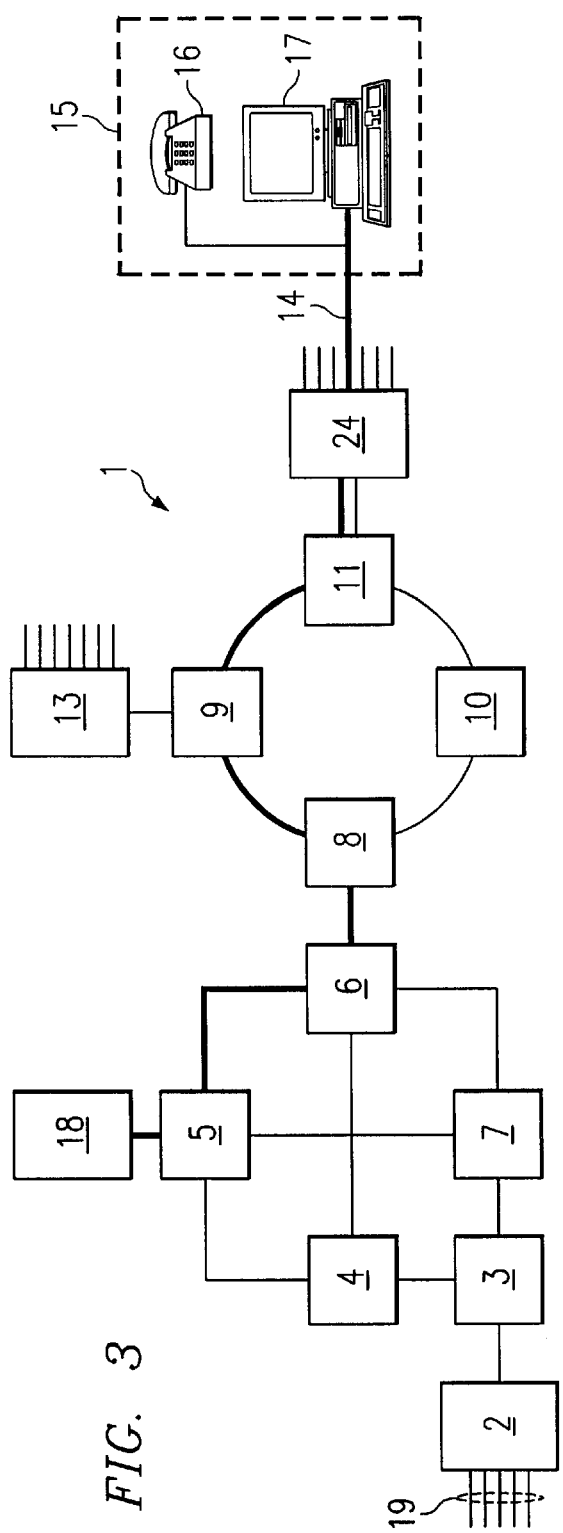
Figure 4:
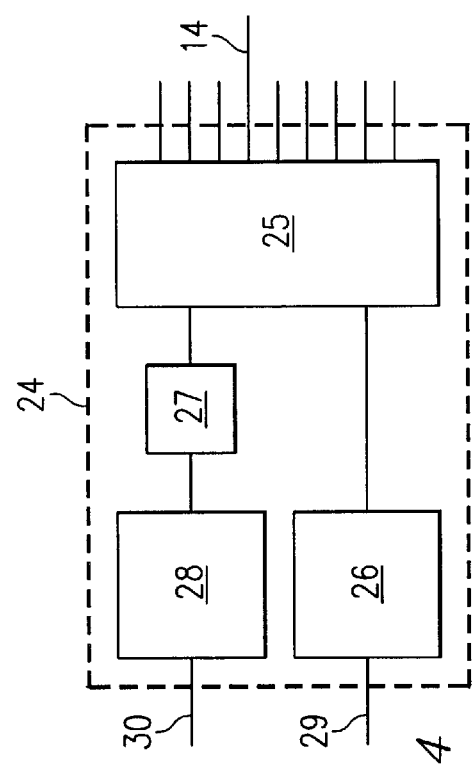
Figure 5:
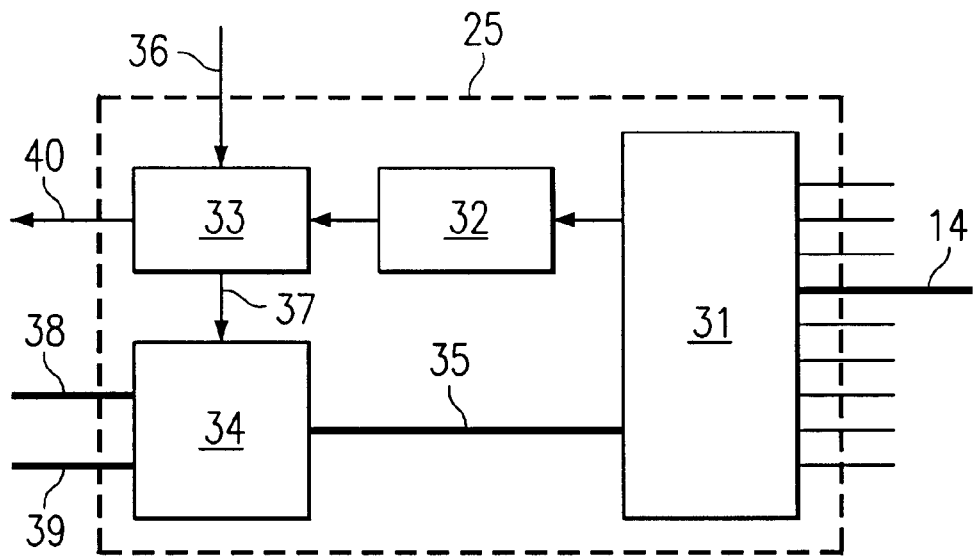
Figure 6:
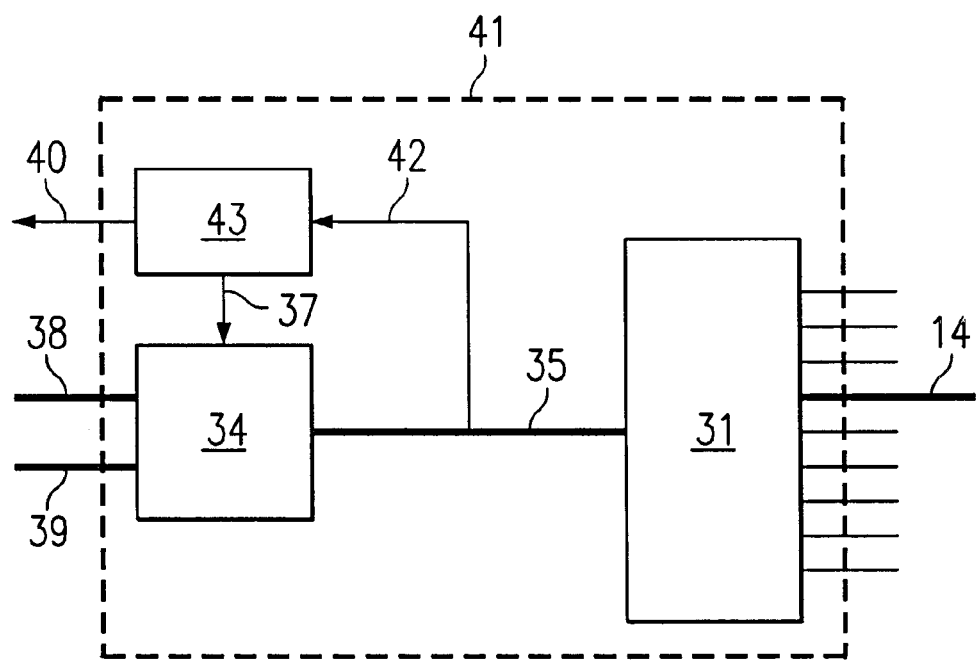

The invention will now be explained more fully below with reference to the drawing, in which FIG. 1 shows a network in which the invention may be applied, FIG. 2 shows how direct data transmission may take place in the network of FIG. 1, FIG. 3 shows how data traffic may be set up in the network of FIG. 1 according to the invention, FIG. 4 shows the structure of a distributor circuit according to the invention, FIG. 5 shows a detector unit for the circuit of FIG. 4, and FIG. 6 shows an alternative embodiment of a detector unit capable of detecting the type of a call during the call.

FIG. 1 shows an example of a telephone or teletransmission network 1 in which the invention may be applied. The network 1 connects an exchange 2 to a large number of subscribers, and in the example shown it is divided into a superior network (often called trunk network) consisting of the nodes or network elements 3, 4, 5, 6 and 7 with associated transmission lines between these and a network in the local area (called access network) with the nodes or network elements 8, 9, 10 and 11. The latter network is typically designed as a ring connection. Although just one of these local networks is shown, a plurality of these networks is usually connected to each of the nodes 3, 4, 5, 6 and 7 in the superior network.

A distributor network 12, 13, usually called a primary multiplexer, is connected to each of the nodes 8, 9, 10 and 11 in the local network, a line being established from said primary multiplexer to each subscriber. For example, the primary multiplexer 12 is connected to i.a. a subscriber 15 whose telephone line is connected partly to a telephone 16 and partly to a personal computer 17. The latter is connected to the line by means of a modem which converts data to analog signals corresponding to ordinary telephone signals. The line 14 from the primary multiplexer 12 to the subscriber 15 is usually a cable twisted in pairs and having metallic conductors, while the rest of the network is frequently built by means of optical fibres.

A second subscriber 18 is connected to another point in network. Although the subscriber 18 is shown connected directly to the network element 5 for clarity, the connection may here also be established via a local network and/or a primary multiplexer, as shown for the subscriber 15. The subscriber 18 may e.g. be an Internet provider or a provider of another corresponding service. The Internet is a separate and global network used for the exchange of data between computers. However, this network is not linked to each individual user, but instead to so-called Internet providers in the individual local areas. The connections between the Internet provider and the individual subscribers are then established via the ordinary telephone network by means of modems. Thus, the Internet provider 18 must possess a large number of modems.

When the subscriber 15 wishes to make a call to the Internet provider 18 to have his computer 17 connected to the Internet, a normal call is made from the computer 17 via its modem, thereby establishing a connection via the thick black line from the computer 17 via the network elements 12, 11, 9, 8, 6, 7 and 3 to the exchange 2 and from there via the network elements 3, 4 and 5 to the Internet provider 18, where the connection to the Internet itself is established by means of a modem and the provider's computer. During the entire duration of the "Internet call" the thick black line and some of the coupling means in the exchange 2 will be occupied, and it will therefore be seen that the expected strong increase in the number of this type of calls will occupy a great part of the resources of both the network and the exchange. This is inexpedient in particular since, in reality, the connection is not utilized for long periods in this type of calls, because the data are frequently transmitted in blocks with long intervals. Further, the calls will frequently be local calls which are charged at a relatively low rate by most network operators, and the network operator's income from these calls is therefore modest.

When the subscriber 15 wishes to make an ordinary telephone call to another subscriber, the procedure is the same as has just been described, a connection being established from the subscriber's telephone 16 via the exchange 2 to another subscriber.

It should be noted that the exchange 2 is connected via the lines 19 to other exchanges in an even greater network. If the Internet subscriber and the Internet provider do not belong to the same exchange, the connection will thus pass several exchanges and thereby occupy even greater resources.

It is shown in FIG. 2 how direct data transmission between subscribers having a great need for data transmission can take place in a known manner. Here, two computers 20 and 21 are connected to the respective network elements 9 and 4 by lines 22 and 23, which are typically optical fibres, and the computers 20 and 21 are provided with interface equipment for these lines.

The connection between the two computers is set up directly via the network elements 9, 8, 6 and 4, and the connection will frequently be a permanently set-up connection, which may optionally be virtual depending on the transmission protocol used. As mentioned, this solution necessitates that the network concerned is linked with the individual terminals, and that these can communicate in the transmission protocol used, and, consequently, the solution is just of interest to subscribers having a great data transmission need.

Various protocols or methods may be used for transferring data between the two terminals. An example of such a method is ATM (Asynchronous Transfer Mode). One of the advantages of the ATM and other corresponding technologies is that network capacity is occupied only in relation to the amounts of data which are actually transferred, as the system uses so-called virtual connections, which are set up by transmitting a set-up request through the network to the desired destination.

The physical network itself, in which the data packets are transmitted, may e.g. be a fibre-optical network using PDH (Plesiochronous Digital Hierarchy) or SDH (Synchronous Digital Hierarchy). Further, a variety of physical media or protocols may be included within the same infrastructure.

ATM is a packet technology transferring traffic between ATM terminals in short packets or cells, each of which is of 53 bytes, of which 48 bytes are used for information proper, while 5 bytes are used for so-called header information used i.a. for controlling the transmission.

The task of the ATM network is merely to transfer ATM cells from one point in the network to another, which, as mentioned, is controlled by the overhead information. The ATM traffic to be transferred by the network may have a constant or a variable bit rate, and owing to the latter in particular the transmission takes place by means of virtual connections which thus just occupy transmission capacity in relation to the data amount transferred in reality. A virtual connection is set up by transmitting information from the transmission point to the network elements which have to be passed to arrive at the destination, concerning which way said elements are to transmit the ATM cells associated with the connection. These may be identified by means of their overhead information.

Thus, when the data traffic is transferred as shown in FIG. 2 and as ATM traffic, it is ensured that only a minor part of the network is occupied (and not the exchange at all), and that this part is loaded only in relation to the amount of data transferred in reality.

As mentioned, this direct solution is much too expensive for subscribers who just have a minor data transmission need, i.e. private persons, and therefore these have been forced to use the method of FIG. 1 till now, which uses modems, and which occupies a disproportionate capacity in the network.

FIG. 3 shows how such transmission may take place instead according to the invention. When the subscriber 15 makes a call from his computer 17 to the Internet provider 18, the call first goes via the line 14 to the primary multiplexer 24. This corresponds to the primary multiplexer 12 shown in FIG. 1, but additionally contains a plurality of other components.

The structure of the primary multiplexer 24 is shown in FIG. 4, from which it appears that it contains a detector unit 25, an A/D converter 27 and two coupling units 26 and 28. The coupling unit 26 for ordinary telephone traffic and the coupling unit 28 for ATM traffic are connected to the network element 11 via the lines 29 and 30, respectively, while the detector unit 25 is connected to the subscriber 15 via the line 14.

As there are only few Internet providers in practice, and since all calls to these—and thereby to their telephone numbers—are always Internet calls, it is possible to identify Internet calls by means of the telephone numbers. By means of the detector circuit 25, which will be described more fully below, the primary multiplexer 24 can determine the type of a call received from e.g. the subscriber 15.

If it is detected in the detector unit 25 that a call is an ordinary telephone call, which means that the call is not made to the telephone number of the Internet provider, the call is set up traditionally via the coupling unit 26 and the network 1 to the exchange 2 and from there to the desired subscriber, as shown in FIG. 1.

If, on the other hand, it is detected in the detector unit 25 that the call is made to the telephone number of the Internet subscriber, it can now just be an Internet call, and this is set up instead to the A/D converter 27, where the analog signals are converted back to data signals. These are then passed to the ATM traffic coupling unit 28 where the data are entered into the ATM system in the same manner as done in FIG. 2 into the computer 20, and the call can then be set up via the line 30 and further on in the network as ATM traffic directly to the Internet provider 18, thus bypassing the exchange 2, as shown in FIG. 3. From the coupling unit 28 and up to the Internet provider 18, the set-up of the call thus takes place in the same manner as the direct connections in FIG. 2, but linking of the fibre-optical network to the subscriber 15 has been avoided, and moreover the subscriber does not have to invest in expensive interface equipment, but uses his modem like before.

It should be added that, of course, the Internet provider must now have the necessary interface equipment to the ATM, as he is to be connected directly to the network, but this equipment replaces a large number of modems, so this investment is reasonable.

The detection of the type of the calls takes place in the detector unit 25, as mentioned, and it is shown in FIG. 5 how this may be designed. The lines from the subscribers, such as e.g. the line 14 from the subscriber 15, are connected to a line interface 31, and the unit moreover contains a register 32 in which telephone numbers received by calls from subscribers are registered, a table 33 in the form of a storage in which the telephone numbers of the relevant Internet providers are stored, and a switch unit 34 to which the calls are passed from the interface 31 via the connection 35. The detector unit 25 can recognize and distinguish between the incoming telephone numbers which are signalled from the subscribers. This takes place in that the number dialled by the subscriber is picked up in the register 32 and is then compared with the number or numbers in the table 33. The table 33 may either be a ROM storage in which the number or numbers concerned are permanently stored, or the table may be currently configured by means of control signals 36 from a control unit (not shown). Most expediently, the table contains the numbers of all the Internet providers relevant to the network element concerned. Typically, there are 2–3 numbers and only rarely more than 10.

If the dialled number is recognized as one of the numbers in the table 33, a control signal 37 is applied from this to the switch unit 34, which transmits the call via the line 38 to the A/D converter 27 and the ATM traffic coupling unit 28. The connection concerned must moreover be mapped into the correct ATM connection to the relevant Internet provider. This may take place by means of a control signal 40 to the coupling unit 28. If, on the other hand, the dialled number is not recognized as one of the numbers in the table 33, the control signal 37 will cause the switch unit 34 to transmit the call via the line 39 to the coupling unit 26, from which the connection is set up as described above.

In the embodiment described above, the detection of the type of the call is performed in the initial phase of the call. This means that the type of the call is detected before the connection is set up so that the setting-up can take place depending on the type. However, it will also be possible to detect the type of a call currently during the call and then change the connection set up, if necessary, if another set-up mode is more expedient for the type of call concerned. For example, it is possible that a call begins as an ordinary telephone call, but then changes its nature during the call to be a data transfer. In that case, the call is switched to proceed like in FIG. 3, so that a smaller part of the network is occupied and the exchange is not loaded.

Therefore, FIG. 6 shows an alternative embodiment of a detector unit 41 which, like before, contains a line interface 31 and a switch unit 34 connected to the line 35. A monitor unit 43 monitors, via the line 42, the signals on the line 35. If data are transmitted, these data will be divided into blocks, and each block contains some recognizable overhead signals depending on the protocol used. These expected signals may be stored in the monitor unit, and it may thus be easily determined by comparison whether the data are according to the protocol concerned. If so, the monitor unit 43 instructs the switch unit 34 via the control signal 37 to change the set-up of the call, as described before.

Although a preferred embodiment of the present invention has been described and illustrated, the invention is not restricted to this, but may be embodied in many different ways within the scope of the subject-matter defined in the following claims. For example, the line 14, which connects the subscriber 15 to the primary multiplexer 12, may be replaced by a mobile telephone connection, and then the primary multiplexer will instead be formed by a base station 17 for the mobile telephone system concerned. Furthermore, more than two different types of calls may be involved, each of which may be set up in its own way in the network.

What is claimed is:

1. A method of setting up connections for a transfer of information in the form of calls between a calling and a called subscriber in a teletransmission network, where each subscriber is connected to the network via a subscriber interface, and where, on the basis of an identification associated with a given call, it is detected whether the call is of a first type or a second type, whereby:

in case of calls of the first type, the connection is set up via a first transmission path which comprises one or more exchanges, and in case of calls of the second type, the connection is set up via or is switched to a second transmission path;

characterized in that the detection of the type of the call takes place at the subscriber interface of the calling subscriber, and that the second transmission path bypasses the exchange or exchanges;

characterized in that the detection of the type of the call may take place at any time during the call, and that the connection, if it does not correspond to the present type of the call, may be switched to the first or the second transmission path.

2. A method according to claim 1, characterized in that the detection of the type of the call takes place during an initial phase of the call, so that the setting up of the connection via the first or the second transmission path takes place from the beginning of the call.

3. A method according to claim 1, characterized in that the detection of the type of the call takes place by detecting the information type transferred during the call.

4. A method according to claim 1, characterized in that the teletransmission network, in which the connections are set up, is a network for transferring telephone traffic, and that calls of the second type are calls to subscribers offering a specific service.

5. A method according to claim 4, characterized in that the detection of the type of the call takes place by comparing a telephone number, which is requested by the calling subscriber, and which belongs to the called subscriber, with a table which contains telephone numbers of the subscribers offering a specific service.

6. A method according to claim 4, characterized in that the service comprises connection of subscribers via the telephone network to a second transmission network.

7. A method according to claim 6, characterized in that the second transmission network is a data transmission network.

8. A method according to claim 1, characterized in that calls of the second type comprise data transmission, and that data are transferred via the second transmission path by means of a protocol which just occupies capacity on the network in relation to the data amount transferred at a given time.

9. A method according to claim 8, characterized in that the protocol is of the Asynchronous Transfer Mode (ATM) type.

10. A method according to claim 1, characterized in that the network, on which the information is transferred, is a fibre-optical network where the transmission may take place according to a Synchronous Digital Hierarchy (SDH system).

11. A method according to claim 10, characterized in that the second transmission path in the network is embedded in the SDH transmission by a special protocol for the transfer of data.

12. A method according to claim 1, characterized in that the part of the network connected to the subscribers from whom calls may be made, consists of cables twisted in pairs and having metallic conductors, while the rest of the network is substantially a fibre-optical network, and that the detection of the type of the call takes place at an interface between the cable of the subscriber and the fibre-optical network.

13. A method according to claim 1, characterized in that at least some of the subscribers from whom calls may be made, are connected to the network via a wireless connection, and that the detection of the type of the call takes place at an interface between the wireless connection and the wired network.

14. A detector unit for use in the setting up of connections for a transfer of information in the form of calls between a calling and a called subscriber in a teletransmission network, where each subscriber is connected to the network via a subscriber interface, and where the detector unit comprises means for detecting on the basis of an identification associated with a given call whether the call is of a first type or of a second type, as well as:

means for setting up calls of the first type via a first transmission path which comprises one or more exchanges;

means for setting up or switching calls of the second type via a second transmission path bypassing the exchange or exchanges;

characterized in that the detector unit is adapted to detect the type of the call at the subscriber interface of the calling subscriber and to set up the second transmission path bypassing the exchange or exchanges characterized in that the detecting means are adapted to detect the type of the call at any time during the call by detecting the information type transferred during the call.

15. A detector unit according to claim 14, characterized in that the detecting means are adapted to detect the type of the call during an initial phase of the call by comparing a telephone number, which is requested by the calling subscriber and which belongs to the called subscriber, with a table which contains telephone numbers of subscribers to whom all calls are of the second type.

* * * * *

UNITED STATES PATENT AND TRADEMARK OFFICE
CERTIFICATE OF CORRECTION

PATENT NO. : 6,421,340 B1
DATED : July 16, 2002
INVENTOR(S) : Lars G. Christensen It is certified that error appears in the above-identified patent and that said Letters Patent is hereby corrected as shown below:

Title page,
Item [57], ABSTRACT,
Line 12, after "(1) comprises" delete "circuitry" and insert -- means --.
Line 12, after "comprises" delete "circuitry" and insert -- means --.

Signed and Sealed this

Fifth Day of April, 2005

JON W. DUDAS
*Director of the United States Patent and Trademark Office*